United States Patent
Cooper et al.

(10) Patent No.: US 7,899,671 B2
(45) Date of Patent: Mar. 1, 2011

(54) RECOGNITION RESULTS POSTPROCESSOR FOR USE IN VOICE RECOGNITION SYSTEMS

(75) Inventors: Robert S. Cooper, Columbia, SC (US); Derek Sanders, Columbia, SC (US); Vladimir Sergeyevich Tokarev, Columbia, SC (US)

(73) Assignee: Avaya, Inc., Basking Ridge, NJ (US)

( * ) Notice: Subject to any disclaimer, the term of this patent is extended or adjusted under 35 U.S.C. 154(b) by 2287 days.

(21) Appl. No.: 10/772,488

(22) Filed: Feb. 5, 2004

(65) Prior Publication Data

US 2005/0177376 A1 Aug. 11, 2005

(51) Int. Cl.
- G10L 15/10 (2006.01)
- G10L 15/04 (2006.01)
- G10L 15/00 (2006.01)
- G10L 15/28 (2006.01)

(52) U.S. Cl. .................. 704/252; 704/251; 704/231

(58) Field of Classification Search ......... 704/231–233, 704/243–257; 706/12, 14–16, 21, 26–28; 379/67.1–72, 74–77, 79–82, 88.01–88.06, 379/88.19–88.28
See application file for complete search history.

(56) References Cited

U.S. PATENT DOCUMENTS

| | | | | |
|---|---|---|---|---|
| 5,452,397 | A * | 9/1995 | Ittycheriah et al. | 704/240 |
| 5,479,488 | A * | 12/1995 | Lennig et al. | 379/88.04 |
| 5,566,272 | A * | 10/1996 | Brems et al. | 704/231 |
| 5,638,425 | A * | 6/1997 | Meador et al. | 379/88.01 |
| 5,983,177 | A * | 11/1999 | Wu et al. | 704/244 |
| 5,999,902 | A * | 12/1999 | Scahill et al. | 704/240 |
| 6,081,779 | A * | 6/2000 | Besling et al. | 704/257 |
| 6,167,377 | A * | 12/2000 | Gillick et al. | 704/240 |
| 6,173,266 | B1 | 1/2001 | Marx et al. | |
| 6,243,713 | B1 * | 6/2001 | Nelson et al. | 1/1 |
| 6,404,876 | B1 * | 6/2002 | Smith et al. | 379/218.01 |
| 6,499,011 | B1 * | 12/2002 | Souvignier et al. | 704/240 |
| 6,523,004 | B1 * | 2/2003 | Vanbuskirk et al. | 704/251 |
| 6,532,444 | B1 * | 3/2003 | Weber | 704/257 |
| 6,629,069 | B1 * | 9/2003 | Attwater et al. | 704/231 |

(Continued)

FOREIGN PATENT DOCUMENTS

GB 2 375 211 A 6/2002

(Continued)

OTHER PUBLICATIONS

European Search Report, Applicatin No. 05250568.2 dated Apr. 6, 2005.

Primary Examiner—James S Wozniak
Assistant Examiner—David Kovacek

(57) ABSTRACT

Systems and techniques for analyzing voice recognition results in order to improve efficiency and accuracy of voice recognition. When a voice activated module undertakes a voice recognition attempt, it invokes a voice recognition module that constructs a list of voice recognition results. The list is analyzed by a results postprocessor that employs information relating to past recognition results and user information to make changes to the list. The results postprocessor may delete results that have been previously rejected during a current recognition transaction and may further alter and reorder the results list based on historical results. The results postprocessor may further alter and reorder the results list based on information relating to the user engaging in the recognition attempt.

16 Claims, 3 Drawing Sheets

U.S. PATENT DOCUMENTS

| | | | |
|---|---|---|---|
| 6,745,161 B1* | 6/2004 | Arnold et al. | 704/7 |
| 6,957,207 B2* | 10/2005 | Sasaki | 706/47 |
| 7,027,987 B1* | 4/2006 | Franz et al. | 704/236 |
| 7,043,432 B2* | 5/2006 | Bakis et al. | 704/260 |
| 7,085,723 B2* | 8/2006 | Ross et al. | 704/275 |
| 7,464,031 B2* | 12/2008 | Axelrod et al. | 704/236 |
| 7,480,612 B2* | 1/2009 | Mori et al. | 704/9 |
| 7,542,902 B2* | 6/2009 | Scahill et al. | 704/251 |
| 7,567,901 B2* | 7/2009 | Chang | 704/247 |
| 7,729,912 B1* | 6/2010 | Bacchiani et al. | 704/252 |
| 2002/0078209 A1* | 6/2002 | Peng | 709/227 |
| 2002/0151334 A1* | 10/2002 | Sharma | 455/566 |
| 2002/0196911 A1* | 12/2002 | Gao et al. | 379/88.03 |
| 2003/0091028 A1* | 5/2003 | Chang et al. | 370/352 |
| 2003/0125945 A1* | 7/2003 | Doyle | 704/246 |
| 2003/0204399 A1* | 10/2003 | Wolf et al. | 704/251 |
| 2004/0034527 A1* | 2/2004 | Hennecke et al. | 704/231 |
| 2004/0083099 A1* | 4/2004 | Scarano et al. | 704/231 |
| 2004/0122666 A1* | 6/2004 | Ahlenius | 704/231 |
| 2005/0177376 A1* | 8/2005 | Cooper et al. | 704/277 |

FOREIGN PATENT DOCUMENTS

| | | |
|---|---|---|
| WO | WO 00/38175 | 6/2000 |
| WO | WO 01/69449 A2 | 9/2001 |

* cited by examiner

RECOGNITION RESULTS POSTPROCESSOR FOR USE IN VOICE RECOGNITION SYSTEMS

FIELD OF THE INVENTION

The present invention relates generally to improvements in automated voice response systems. More particularly, the invention relates to a recognition results postprocessor for performing processing on a recognition results list in light of user configuration details and previous recognition results, in order to improve recognition accuracy.

BACKGROUND OF THE INVENTION

Automated voice response systems, particularly those employing speech recognition, typically receive a voice input from a user and then construct a recognition results list of possible matches to the user input. Frequently, the system simply presents the matches to the user in order, seeking confirmation that a match is the input intended by the user. For example, a system may receive an input such as "John Smith" from the user, compare the input to a list of existing names in the directory to create a list of possible matches including the names "John Smith," "Jane Smith," "Jake Smith" and "Johann Smithers," and simply present these names to the user in order. Sometimes, given the current state of recognition technology, none of the presented names will match what the user intended, and the system will ask the user to repeat the voice input. The system will then create a new list of possible matches for presentation to the user.

If no account is taken of the user identity and of past recognition results, it is entirely possible that some of the names in the list constructed as a result of the repeated utterance will match some of the names that were previously presented and rejected. Presentation of names that were just rejected wastes the user's time and can result in considerable user dissatisfaction and frustration. In addition, even an accurate selection may be incomplete. For example, identifying "John Smith" may not identify whether the user wishes to call his landline number or his mobile number, so that once "John Smith" has been identified as the desired result, the user may still need to be presented with the choice of which specific number to call.

A system employing voice recognition may include a number of modules or applications that use voice recognition results, and each such module or application may use recognition results in different ways. For example, a system may provide directory lookup and voice dialing for persons inside an organization, may provide bank account information services for persons who may call from outside the organization and may provide general educational information for persons who may call from outside the organization. Each module may have its own configuration parameters and may require different treatment of recognition results in order to achieve the best and most efficient matching. In addition, some modules may have information available that can be taken advantage of to improve results, while others may not. For example, a module that provides services to users within an organization may have a user profile available for each user, while such information may not be available to a module that provides services to external users whose identity is not known in advance.

There exists, therefore, a need for systems and techniques to process recognition results to improve recognition efficiency and accuracy for various modules, with such systems being adapted to receive and interpret differing information furnished or used by the different modules.

SUMMARY OF THE INVENTION

A system according to one aspect of the invention includes a central server hosting various modules providing services to users. The modules may suitably employ voice recognition in order to interpret user inputs. When a module requires a response from a user, it provides a prompt to the user, asking the user to provide a voice input. A voice recognition module receives the input and prepares a recognition results list of candidate recognition results, with each candidate recognition result representing an estimate by the voice recognition module of the user input. A confidence score, that is, a score representing the confidence that a particular result matches the user input, is associated with each candidate recognition result, and the candidate recognition results are suitably ranked by confidence score.

Once the list of candidate recognition results is prepared, the list is processed by a results postprocessor. The results postprocessor receives parameters from the module that is to act on the recognition result, and also retrieves or is provided with information such as user information and prior results information. The prior results information suitably represents the results of past recognition attempts by the module that is to act on the recognition result.

Each attempt to recognize what the user is saying may be defined as a transaction, and the module requiring the voice input indicates the start and stop of each transaction to the results postprocessor. The results postprocessor is updated with events or results that occur during a transaction, such as rejections of a candidate recognition result by a user. The results postprocessor processes the recognition results list in light of known user information and results information previously provided, as well as information relating to occurrences during the transaction. Once the recognition results list has been processed, the candidate results are presented to the user for acceptance or rejection.

A more complete understanding of the present invention, as well as further features and advantages of the invention, will be apparent from the following Detailed Description and the accompanying drawings.

DETAILED DESCRIPTION

Figure 1:
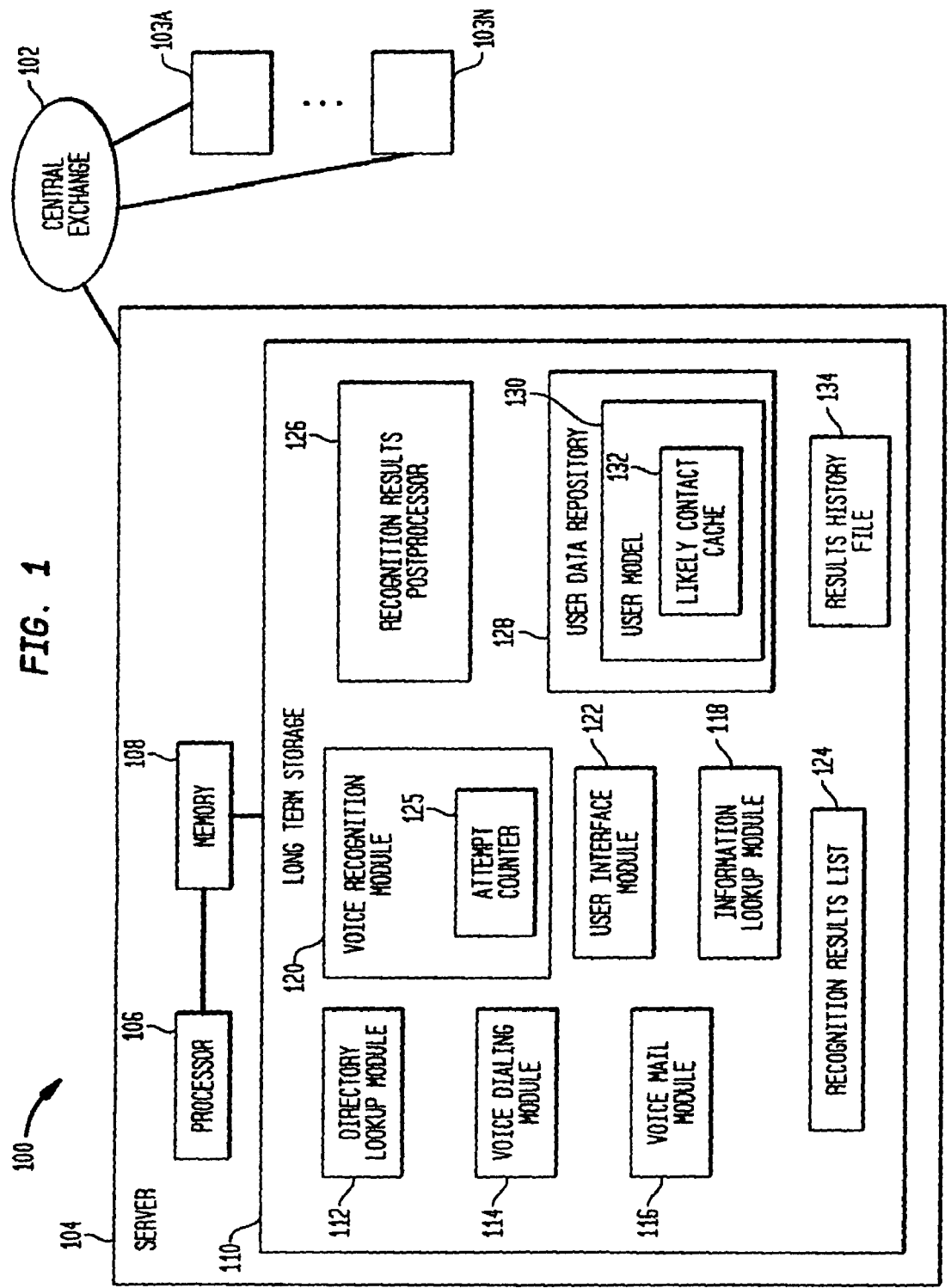
FIG. 1 illustrates a system employing a recognition results postprocessor according to an aspect of the present invention.

FIG. 1 illustrates a system 100 employing a central exchange 102, serving a plurality of users communicating through the use of telephone sets such as the sets 103A . . . 103N. The telephone sets may be internal or external to an organization by or for which the system 100 is maintained. The central exchange 102 communicates with a server 104, operative to provide various services to users of telephone sets such as the telephone sets 103A . . . 103N. The server 104 includes a processor 106, memory 108 and long term storage 110. The server 104 hosts various modules, suitably implemented as software residing on the long term storage 110 and executed as needed by the processor 106. The modules suitably include a directory lookup module 112, a voice dialing module 114, a voice mail module 116 and an information lookup module 118. Each of the various modules 112-118 may suitably be operated using voice recognition. The server 104 therefore hosts a voice recognition module 120, that receives voice inputs from a user and interprets the voice inputs to issue commands and provide data to the modules 112-118. Suitably, the server 104 also hosts a user interface module 122, that provides an initial interface to the user, allowing the user to select the desired module. Suitably, the user interface module 122 presents one or more voice prompts to the user in order to allow selection of the desired module. The interface module 122 may simply ask the user what he or she wishes to do, and may interpret the user's response in order to select the desired module.

Alternatively, the interface module 122 may present a menu of choices to the user and interpret a user response provided after the presentation of choices. The user provides a voice input in response to the prompts provided by the module 122. This voice input is processed by the voice recognition module 120 and passed to the user interface module 122. The user interface module 122 then invokes the selected one of the modules 112-118. The invoked module presents its own initial menu to the user, and the user then provides a response which is interpreted by the voice recognition module 120. The voice recognition module 120 operates by creating a list of possible matches to the user's voice input. Creation of the list of possible matches depends on the module for which the voice recognition module is performing voice recognition. For example, for directory lookup or voice dialing, the list of possible matches may be created by searching a directory of names, while for voicemail or information lookup, the list of possible matches may be created by examining a list of commands.

The voice recognition module 120 creates a recognition results list 124 of possible matches, which may then be presented to the user for confirmation. The recognition results list suitably comprises information used for matching to the user's voice input, such as the name of a party, and may also include additional information, such as information that can be found in a directory entry associated with the party. The recognition results list also suitably includes a confidence score for each entry, indicating a level of confidence in the correctness of the match. Preparation of the recognition results list 124, and computation of the confidence scores for the entries in the list 124, may be accomplished using known voice recognition techniques.

The voice recognition module maintains an attempt counter 125 that tracks the number of times an attempt at recognition has been made in a current transaction, but all choices in the list 124 have been rejected. If the value stored in the attempt counter 125 exceeds predetermined criteria, the attempt at voice recognition may be abandoned and other means employed to determine the user intent.

Creating and presenting a list without taking into account the specific needs of the module for which the list is created, or previous recognition results, can lead to inefficient ordering of recognition results and wasted user time. For example, past recognition results may suggest that when the user "Bob Jones" seeks to call the user "John Smith," the number desired is John Smith's mobile number. If this fact is not taken into account, the user may be repeatedly presented first with the choice to call John Smith's office number and then, after this choice is rejected, to call his mobile number. In order to achieve greater efficiency, a recognition results postprocessor 126 operates on the list 124 in order to take into account factors such as past experience, user preferences and predetermined parameters. The recognition results postprocessor 126 receives information from a user data repository 128 and the module 112-118 for which the recognition is being performed. The information from the user data repository 128 may include information for each user, such as a user model 130. The user model 130 includes information that can be used to evaluate whether a particular candidate recognition result is the result intended by the user. One example of information that may be included in the user model 130 is a likely contact cache 132. The likely contact cache 132 includes names and associated directory records of persons the user is considered more likely to call. The use of a cache similar to that discussed herein is addressed in "Methods and Apparatus for Data Caching to Improve Name Recognition in Large Namespaces," U.S. patent Ser. No. 10/772,885, assigned to a common assignee with the present invention and filed on even date herewith, and incorporated herein by reference in its entirety.

The information provided by a module such as one of the modules 112-118 may include recognition history, either over the immediately ongoing recognition attempt, past recognition attempts or both. For example, suppose that the user is attempting to place a call using the voice dialing module 114. The user has provided the name "John Smith," and the recognition results list 124 includes the names "Jane Smith," "Jake Smith," and "Johann Smithers." The voice dialing module 114 has presented these names to the user for confirmation, and the user has rejected them. The voice dialing module 114 then prompts the user to repeat the input, and the voice recognition module 120 processes the repeated input to create a new recognition list. At the same time, the voice dialing module indicates to the recognition results postprocessor 126 that the names "Jane Smith," "Jake Smith," and "Johann Smithers" have been rejected in the immediately prior recognition attempt, allowing the recognition results postprocessor 126 to remove these names from any list that is generated for the current attempt.

In addition, the recognition results postprocessor 126 may incorporate the information received from the module 114 into a results history file 134, allowing the postprocessor 126 to subsequently evaluate a list created in a recognition attempt in light of the fact that these names have previously been rejected and may therefore have an increased probability of being incorrect.

Figure 2:
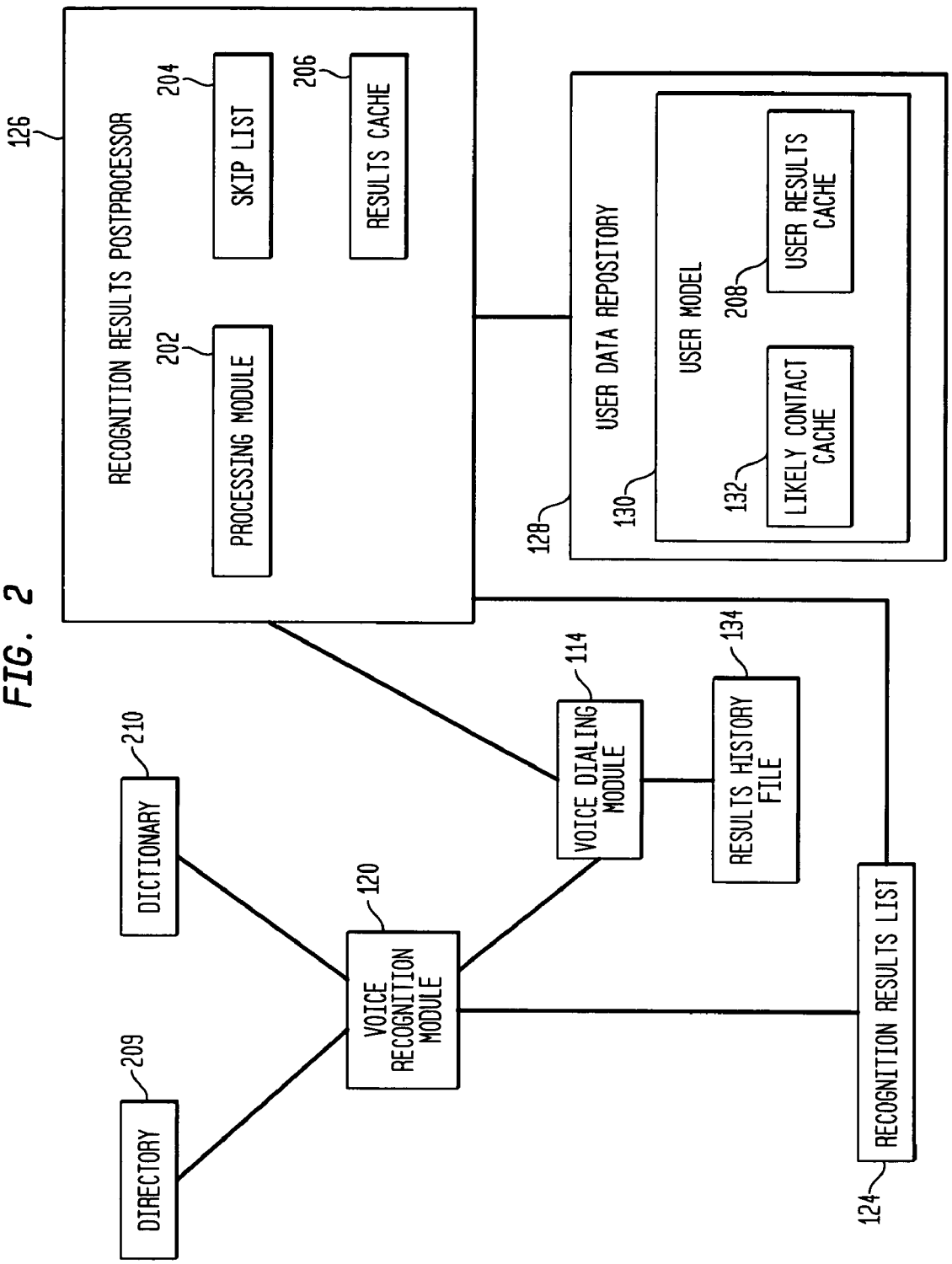
FIG. 2 illustrates additional details of a recognition results postprocessor according to an aspect of the present invention.

FIG. 2 illustrates additional details of the recognition results postprocessor 126, showing, for purposes of example, the interaction between the postprocessor 126 and the voice dialing module 114. While the voice dialing module 114 is shown in FIG. 2 and discussed below by way of example, it will be recognized that in the system 100, the postprocessor 126 interacts in a similar way with each of the other modules 112, 116 and 118. In addition, it will be recognized that a postprocessor such as the postprocessor 126 could operate in a way similar to that discussed below in order to provide services to any module or device that needed to choose a particular voice recognition result.

The recognition results postprocessor 126 includes a processing module 202. The results postprocessor 126 also receives the results of user decisions, that is, the confirmation or rejection of a suggested recognition result. The results postprocessor 126 stores rejected results in a skip list 204 and stores accepted results in a results cache 206. The skip list 204 is typically constructed for a single transaction and cleared after the transaction is completed. The recognition results cache 206 may suitably include historical data retrieved from the historical results file 134 by the module 114 and passed to the postprocessor 126 by the module 114 at an appropriate time, for example at the beginning of a recognition transaction or at the beginning of a telephone call.

The results postprocessor 126 also employs various recognition parameters from the module for which the recognition is performed, such as the module 114. When a module such as the module 114 needs voice recognition to be performed, it suitably initiates a voice recognition transaction and provides the postprocessor 126 with an indication that the transaction is starting. The module 114 invokes the voice recognition module 120, which receives a user input and creates the list 124. The module 114 also passes commands and parameters to the processing module 202. The commands and parameters indicate various criteria the postprocessor 126 is to use in evaluating the list 124.

The following parameters may suitably be employed:

Size of the list 124, that is, the maximum number of entries to be included in the list 124.

Contents of the recognition results cache.

Size of the results cache, that is, the maximum number of entries to be maintained in the results cache.

Final list size, that is, the maximum number of recognition results to be returned to the module 114 after processing by the postprocessor 126.

Upper and lower rejection thresholds for including recognition results in the list 124. Each suggested recognition result presented in the list 124 is typically associated with a confidence level and the recognition results are ranked by confidence level. If a result exceeds the upper threshold, it will be retained, while if the result falls below the lower threshold, it will be rejected. If a result falls between the upper and lower thresholds, it will be retained only if it appears in the results cache 206.

Confidence increase value. The confidence increase value is an amount by which to increase the confidence score of a recognition result if it appears in the results cache 206. The typical effect of this confidence increase value is a reordering of the list 124. An item appearing in the list and also appearing in the results cache is likely to be promoted over items appearing in the list and not appearing in the results cache.

Processing technique. The processing module 202 may employ several possible methods of processing the entries in the list 124 depending on whether they appear in the results cache 206. These methods may include "greedy," where all result cache items appear above non-cache items, "conservative," where the first cache item is promoted to the top and the confidence value associated with the rest of the cache items is increased by the amount equal to the difference between the first non-cache and cache item confidence and "fixed," where the confidence value of all cache items is increased by a fixed amount, and may be selected based on a command from the module 114.

Confidence delta value. This is a value that will be subtracted from the highest confidence score associated with an entry in the list 124. The use of the confidence delta value allows setting of a range of confidence values within which the results in the list 124 will be considered. Setting the confidence delta value to 0 prevents specification of the confidence range.

Choice to use or not to use the skip list 204. The module 114 passes a parameter to the postprocessor 126 to select use or nonuse of the skip list 204.

Choice to use or not to use the results cache 206. The module 114 passes a parameter to the postprocessor 126 to select use or nonuse of the results cache 136.

The module 114 may also issue commands to the postprocessor 126. These commands include commands to start, stop or abort a recognition transaction, to pass the list 124 to the postprocessor 126, to direct the postprocessor 126 to furnish the current estimated best result to the module 114, or to retrieve a specified intermediate result.

Typically, the module 114 will set parameters such that the skip list 204 and the results cache 206 are both used. The list 124 and the results cache 206 will be set to a predetermined maximum size and the upper and lower confidence thresholds will be set to values estimated to provide reasonable upper and lower confidence bounds for entries in the list. The user model 130 will include elements such as the likely contact cache 132 and may include elements such as a user results cache 208. The user results cache 208 includes recognition results that have previously been confirmed during voice recognition transactions for the user. Entries in the user results cache may be considered more likely to be correct user recognition results in a particular transaction. If the model 130 includes a user results cache such as the cache 208, the user results cache 208 may be examined and selected entries added to the results cache 206.

To take an example of the operation of the postprocessor 126, suppose that a user "Bob," whose user model is the user model 130, invokes the voice dialing module 114. The voice dialing module 114 directs the postprocessor 126 to initiate a transaction and passes parameters to the postprocessor 126, as discussed above. The module 114 adds entries to the results cache 206, indicating past results of the operation of the module 114. The postprocessor 126 retrieves and examines the user model 130 and combines the user results cache 208 with the results cache 206.

The module 114 presents a voice prompt to the user and invokes the recognition module 120. The recognition module 120 creates a set of recognition results by comparing the user's voice input to a stored collection of data. For telephone dialing operations, this collection may suitably take the form of a directory 209, while for operations such as information retrieval, the collection may take the form of a dictionary 210, a database, or the like. The postprocessor 126 examines the list 124 in light of the criteria provided to the postprocessor 126 at the beginning of the transaction and accepts the entries meeting the criteria. The postprocessor 126 examines the results cache 206 and the user contact cache 132 and performs reordering of the list 124, taking into account any matches between the list 124 and the caches 132 and 206. At this point, no entries are present in the skip list 204, so the skip list 204 is ignored.

At this point, suppose the party the user wishes to call is "John Smith." The voice recognition module 120 has created the following list:

| Result No. | Recognition Result | Confidence |
| --- | --- | --- |
| 1 | Joanne Smith | 60 |
| 2 | Jane Smith | 58 |

The module 114 engages in the following dialog with the user.

| | |
| --- | --- |
| System: | "Joanne Smith?" |
| User: | No. |
| System: | "Jane Smith?" |

| | |
|---|---|
| User: | "No." |
| System: | "Please say the name again." |

During this dialog, the module 114 has provided the postprocessor 126 with the result of each attempt at confirmation. In this case, both results have been rejected, and each rejected result has been added to the skip list 204. In this case, none of the results in the list 124 matches the party that the user intended, so each result in the list was presented to the user. It will be recognized that in some instances, a user will accept an entry before an entire list of possibilities is presented.

Returning to the example, on the second attempt, the following set of results is obtained:

| Result No. | Recognition Result | Confidence |
|---|---|---|
| 1 | Joanne Smith | 60 |
| 2 | Jake Smith | 58 |
| 3 | John Smith | 56 |

It will be noted that now the desired name, "John Smith," appears on the list 124. In the list as initially returned, however, the desired name is in the lowest position.

Once the list 124 has been obtained, it is processed by the postprocessor 126. The name "Joanne Smith" is now present in the skip list 204, because it was rejected during the previous attempt. Therefore, the name "Joanne Smith" is removed from the list 124. In addition, the postprocessor 126 examines the user model 130 and discovers that the name "John Smith" is in the results cache 206. The name "John Smith" is present in the results cache 206 because it appears in the likely contact list 132 for the user. At initiation of the transaction, the postprocessor examined the user model 130, as well as results information received from the module 114, and created the results cache 206.

The entry for "John Smith" in the results cache 206 includes information related to the specific way in which the user is likely to contact the party. This information includes his location, as well as the expected contact method, for example, office telephone or mobile telephone. This information is retrieved from the results cache and added to the entry for "John Smith" in the list 124. In addition, the entry for "John Smith" is promoted to the top of the list 124. The list 124, therefore, after processing by the postprocessor 126, appears as follows:

| Result No. | Recognition Result | Confidence | Cache Data |
|---|---|---|---|
| 1<br>Phone = Mobile | John Smith | 56 | Location = Columbia, SC; |
| 2 | Jake Smith | 58 | |

At this point, the module 114 presents the results to the user. The interaction between the module 114 and the user may now proceed as follows:

| | |
|---|---|
| System: | "John Smith?" |
| User: | "Yes." |
| System: | "John Smith in Columbia, SC?" |
| User: | "Yes." |
| System: | "Dial his mobile number?" |
| User: | "Yes." |
| System: | "Dialing." |

Alternatively, if the confidence level were sufficiently high, the system 100 might ask if it should dial the mobile number for John Smith in Columbia, S.C.

In the second interaction, the processing performed by the postprocessor 126 made the recognition process much more efficient. In the first interaction, postprocessing did not greatly speed the interaction because none of the results in the list 124 was a match. At the time, it was not known whether or not any of the results was a match, so there was nothing for the module 114 to do other than to present the results to the user for confirmation or rejection. However, in the second interaction, when one of the results was a match for which there was stored cache data and a previously rejected result could be eliminated, the speed of the process was greatly increased. The previously rejected result was again rejected, but this time there was no need to present it to the user. In addition, information reflecting previous experience was used to assign a higher priority to one result and to include additional information with that result. This approach advantageously makes use of previous experience information so that the first choice presented to the user is a choice that was deemed more likely correct in the light of experience.

Figure 3:
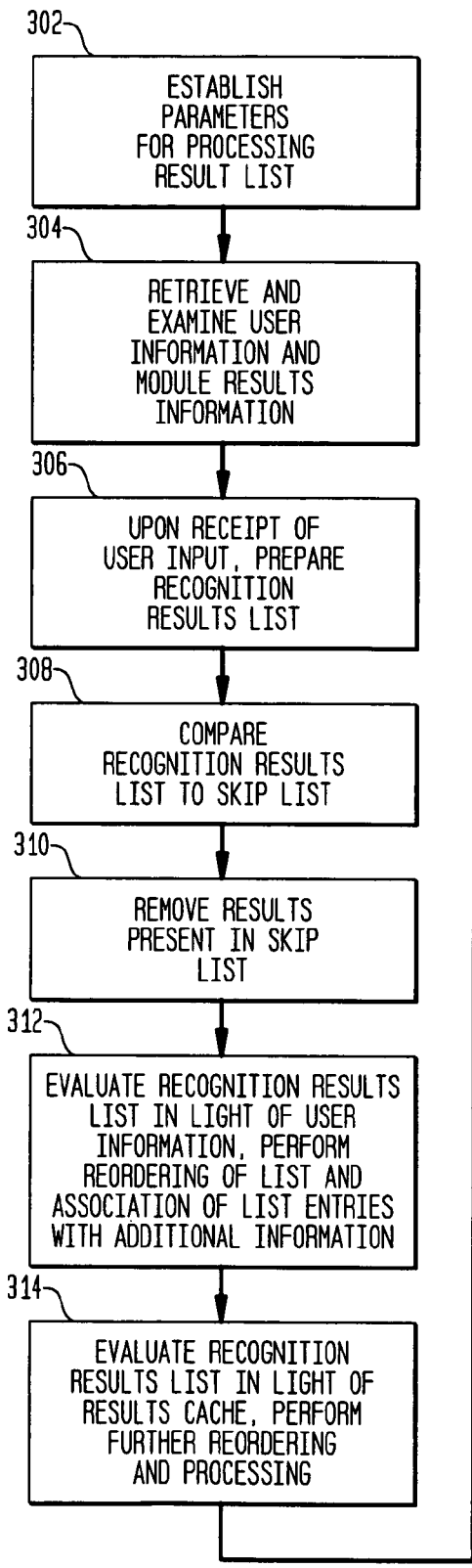
FIG. 3 illustrates a process of voice recognition employing a recognition results postprocessor according to an aspect of the present invention.
Figure 3:
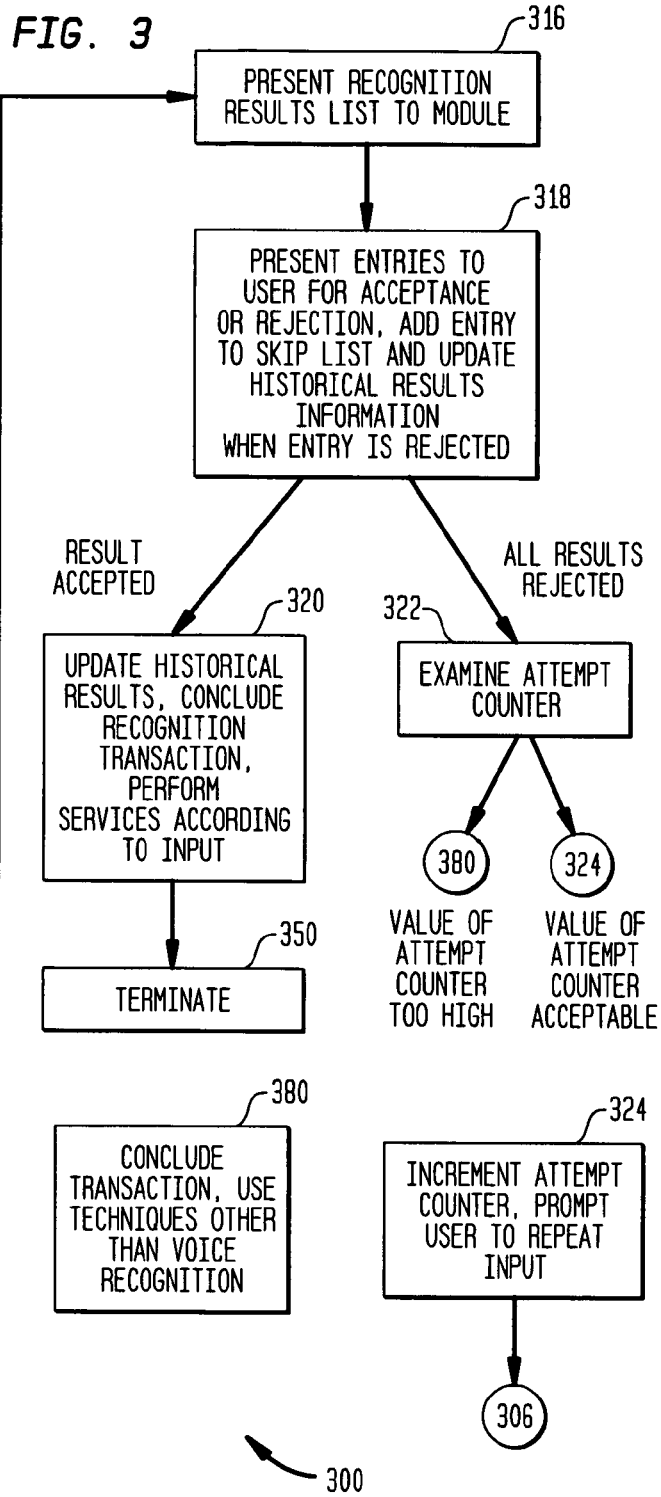

FIG. 3 illustrates a process 300 of voice recognition according to an aspect of the present invention. The process 300 may suitably be implemented using a system similar to the system 100 of FIG. 1. At step 302, upon invocation by a user of a voice activated module providing services to a user as directed by user voice responses, parameters are established for processing of a voice recognition result list to be returned to the module. The parameters may suitably include parameters to be used to determine which results are to be included in a results list and various criteria for examining and reordering the results list. At step 304, user information and module results information is retrieved and examined, and stored in an easily accessible format so as to be used in evaluating a results list. The user information may suitably comprise a user model including a contacts cache, and the module results information may suitably include historical results relating to confirmation or rejection of recognition results previously presented to the module.

At step 306, upon receipt of a user input, a recognition results list is prepared. At step 308, the recognition results list is compared to a skip list reflecting results that have already been rejected by the voice activated module during the current transaction. At the beginning of the transaction, the skip list is empty, but as the transaction continues, rejected results are added to the skip list. At step 310, results present in the skip list are removed from the recognition results list. At step 312, the recognition results list is evaluated in light of the user information and reordering of the results list, as well as association of additional information with results list entries, is performed in light of the user information. For example, if a recognition result corresponds to an entry in a user contact cache, that recognition result may be moved higher in the list. In addition, information found in the contact cache, such as a preferred contact method, may be added to the entry in the results list.

At step 314, further evaluation of the list is performed in light of the results cache including historical information relating to past transactions, with a reordering and other processing being performed according to predetermined criteria. At step 316, the recognition results list is presented to the voice activated module. At step 318, the entries in the list are presented to the user for acceptance or rejection. Whenever a user rejects an entry, the entry is added to the skip list. In addition, further updates to the historical results information may be performed. For example, the number of times a result has been accepted or rejected may be updated. Past experience of a high number of acceptances or rejections of a result appearing in a recognition results list may tend to indicate the likelihood that the result is or is not a match to a user input in the current transaction.

If the user accepts an entry, the process proceeds to step 320, the historical results are updated, the recognition transaction is concluded and services are performed or information entries recorded according to the information or command provided by the recognition result. The process then concludes at step 350. If the user rejects all entries, the process proceeds to step 322 and an attempt counter is examined. If the value of the attempt counter exceeds a predetermined value, the transaction is concluded, the process proceeds to step 380 and techniques other than voice recognition are employed to receive user input. If the value of the attempt counter does not exceed the predetermined value, the process proceeds to step 324, the attempt counter is incremented and the user is prompted to repeat the input. Depending on the value of the attempt counter and user experience information stored in the user model, additional explanatory prompts may also be provided. The process then returns to step 306.

While the present invention is disclosed in the context of a presently preferred embodiment, it will be recognized that a wide variety of implementations may be employed by persons of ordinary skill in the art consistent with the above discussion and the claims which follow below.

We claim:

1. A voice recognition system comprising:
   a plurality of voice activated modules for receiving voice recognition results representing voice inputs from a user and taking actions in response to the voice inputs;
   a voice recognition module for receiving voice inputs from a user and performing voice recognition on the voice inputs, performing voice recognition on a voice input comprising identifying members of a collection of elements representing potential matches to the voice input, the voice recognition module being operative to prepare a list of potential voice recognition results for a voice input under consideration, each of the potential voice recognition results representing a candidate for a result matching the voice input received from the user and having an associated confidence level;
   a results postprocessor for processing the list of potential voice recognition results to improve speed and accuracy of voice recognition, the results postprocessor being operative to make changes to the list based on information relating to past results of recognition attempts in order to associate a higher priority with members of the list having a higher likelihood of matching the voice input under consideration as indicated by the past results of recognition attempts; and
   wherein the processing of the list of potential voice recognition results comprises comparing the associated confidence levels of the potential voice recognition results to an upper threshold and a lower threshold, wherein the potential voice recognition results are kept if the associated confidence levels are above the upper threshold, the potential voice recognition results are not kept if the associated confidence levels are below the lower threshold, and potential voice recognition results with associated confidence levels between the upper threshold and the lower threshold are only kept if they match any of the past results of recognition attempts.

2. The system of claim 1, wherein the results postprocessor is further operative to make changes to the list based on previously stored information relating to expected user actions.

3. The system of claim 2, wherein the previously stored information relating to expected user actions comprise a user model, the user model comprising a likely contact cache including entries for contacts the user is estimated to be likely to call.

4. The system of claim 3, wherein making changes to the list includes reordering the list if an entry in the result list corresponds to an entry in the likely contact cache.

5. The system of claim 4, wherein the information relating to past results of recognition attempts includes information relating to results of a current recognition transaction.

6. The system of claim 5, wherein the information relating to past results of recognition attempts includes a skip list indicating rejected results during the current recognition transaction, and wherein making changes to the list includes removing results appearing in the skip list from the result list.

7. The system of claim 6, wherein the results postprocessor is operative to receive parameters from a module engaging in a voice recognition attempt and to adapt its operation based on the parameters.

8. A results postprocessor for improving efficiency and accuracy of voice recognition, comprising:
   a repository of information relating to a current voice recognition attempt; and
   a processing module for processing potential voice recognition results in a result list, the potential voice recognition results representing members of a collection of elements representing potential matches to a voice input under consideration in a current voice recognition attempt, each potential voice recognition result having an associated confidence level, the processing module being operative to examine information in the repository relating to the current voice recognition attempt and to make changes to a results list compiled in response to a voice input, the changes being made based on the information stored in the repository, the changes associating a higher priority with results in the results list that are indicated to have a higher priority of matching the voice input based on information in the repository relating the characteristics of elements of data collection; and
   wherein the processing of the list of potential voice recognition results comprises comparing the associated confidence levels of the potential voice recognition results to an upper threshold and a lower threshold, wherein the potential voice recognition results are kept if the associated confidence levels are above the upper threshold, the potential voice recognition results are not kept if the associated confidence levels are below the lower threshold, and the potential voice recognition results with associated confidence levels between the upper threshold and the lower threshold are only kept if they match any of the past results of recognition attempts.

9. The results postprocessor of claim 8, wherein the changes to the results list include removing results that have been rejected during a current recognition transaction.

10. The results postprocessor of claim 9, wherein the processing module is further operative to retrieve user and historical information and to make changes to the results list based on the user and historical information.

11. The results postprocessor of claim 10, wherein the user information includes a likely contact cache including contacts the user is estimated as likely to call and the changes to the result list include reordering the results list if an entry in the results list corresponds to an entry in the likely contact cache.

12. A method of analyzing voice recognition results, comprising the steps of:
examining a list of voice recognition results representing candidates for matches to a voice input from a user, the candidates being members of a collection of data selected as potential matches to a particular voice input under consideration, each voice recognition result associated with a confidence level, the list being complied in response to the voice input under consideration;
making changes to the list of voice recognition results using a processor based on information relating to results of past recognition attempts, to associate a higher selection priority with members of the list indicated as having a higher priority of matching the voice input based on the results of past recognition attempts;
wherein the making changes to the list of voice recognition results comprises comparing associated confidence levels of the voice recognition results to an upper threshold and a lower threshold, wherein the voice recognition results are kept if the associated confidence levels are above the upper threshold, the voice recognition results are not kept if the associated confidence levels are below the lower threshold, and the voice recognition results with an associated confidence level between the upper threshold and the lower threshold are only kept if they match any of the past results of recognition attempts.

13. The method of claim 12, wherein the step of making changes to the list based on information relating to results of past recognition attempts includes removing results previously rejected during a current voice recognition transaction.

14. The method of claim 13, wherein the step of making changes to the list based on information relating to results of past recognition attempts includes reordering the list based on historical recognition results.

15. The method of claim 14, wherein the step of making changes to the list based on information relating to results of past recognition attempts includes making changes to the list based on information relating to a user engaging in a current voice recognition transaction.

16. The method of claim 15, wherein the step of making changes to the list based on information relating to a user engaging in a current voice recognition transaction includes examining a likely contact cache indicating contact the user is estimated as likely to call and reordering the list if an entry in the list corresponds to an entry in the likely contact cache.

* * * * *